(12) United States Patent
Winters et al.

(10) Patent No.: US 11,899,806 B1
(45) Date of Patent: Feb. 13, 2024

(54) MANAGING DATA PERMISSIONS FOR DISPARATE DATA SETS

(71) Applicant: Amazon Technologies, Inc., Seattle, WA (US)

(72) Inventors: John Thomas Winters, Seattle, WA (US); Guanxu Yu, Seattle, WA (US); Xuefeng Zhai, Seattle, WA (US); Vamshi Krishna Surabhi, Redmond, WA (US); Dinesh Thangaraju, Bothell, WA (US); Nitin Kishore Gupta, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 297 days.

(21) Appl. No.: 17/359,331

(22) Filed: Jun. 25, 2021

(51) Int. Cl.
*G06F 21/62* (2013.01)
*G06F 16/25* (2019.01)

(52) U.S. Cl.
CPC ........ *G06F 21/6218* (2013.01); *G06F 16/252* (2019.01)

(58) Field of Classification Search
CPC .......................... G06F 21/6218; G06F 16/252
See application file for complete search history.

(56) References Cited

U.S. PATENT DOCUMENTS

| | | | | |
|---|---|---|---|---|
| 7,013,290 | B2 * | 3/2006 | Ananian | H04L 63/102 705/26.42 |
| 7,668,885 | B2 * | 2/2010 | Wittke | G06N 5/00 707/723 |
| 10,503,923 | B1 * | 12/2019 | Gupta | G06F 21/6218 |
| 10,853,356 | B1 * | 12/2020 | McPherson | G06F 16/24 |
| 11,113,273 | B2 * | 9/2021 | Deshpande | G06F 16/2393 |
| 11,704,331 | B2 * | 7/2023 | Caldwell | G06F 16/283 707/602 |
| 2020/0311031 | A1 * | 10/2020 | Sim-Tang | G06F 21/6245 |

* cited by examiner

*Primary Examiner* — Han Yang
(74) *Attorney, Agent, or Firm* — Knobbe, Martens, Olson & Bear LLP

(57) ABSTRACT

Features are disclosed for managing multiple heterogeneously owned data stores (e.g., data sets, data lakes) and provisioning a framework for data consumers and data publishers. A computing device can obtain a plurality of data catalogs associated with the data stores. For example, the computing device may update a hybrid data catalog with information from the plurality of data catalogs. The computing device can further provide a portion of the plurality of data catalogs to a data consumer. The computing device may provide the portion of the plurality of data catalogs based on permissions provided by the data publisher. In response, the computing device can receive a request to access a data store associated with the plurality of data catalogs. The computing device can transmit the request to a corresponding data publisher and, based on a response by the data publisher, may modify the distinct access controls for the data store.

21 Claims, 6 Drawing Sheets

MANAGING DATA PERMISSIONS FOR DISPARATE DATA SETS

BACKGROUND

Many organizations use databases, such as relational databases, that store data in silos. Such databases typically do not natively support services that allow the data to be shared with other applications. Multiple versions of the same data entity can occur in one or more silos such that it may be unclear which data entity is authoritative. A common approach to data management is to feed multiple data sets of entities into a data store (such as a data lake or data warehouse). Each data store may be a separate entity with its own data catalog identifying metadata associated with the data store. Further, each data store may be associated with its own distinct access controls identifying data consumers that are authorized to access the data store. Each data store may be disparate (e.g., heterogeneously owned) and may be decentralized from other data stores such that each data store may be managed in a silo (e.g., in an isolated manner).

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
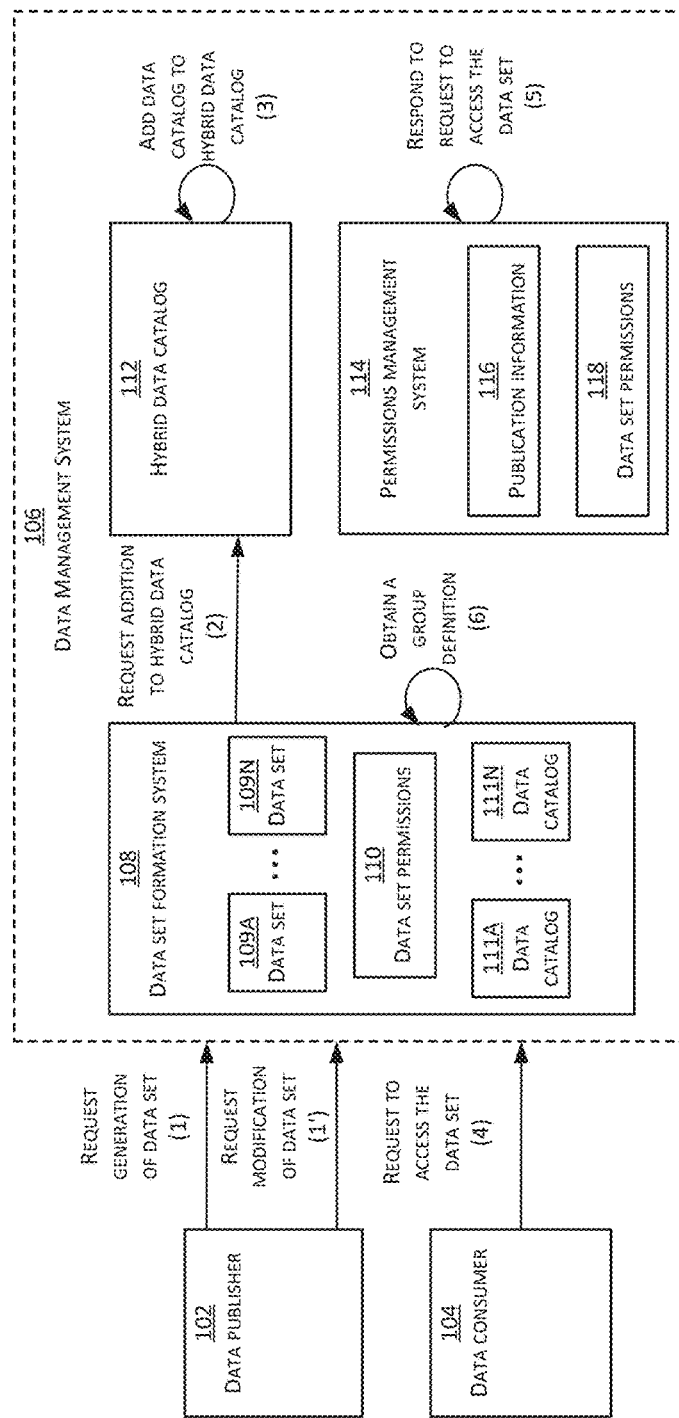
FIG. 1 depicts a schematic diagram of an example networked environment according to some embodiments.

The present disclosure generally relates to provisioning and managing a centralized permission management framework for heterogeneously owned data sets (including data lakes, data warehouses, etc.) for data publishers (e.g., data set owners) and data consumers. The data publishers may publish data to data sets and the data consumers may consume data from the data sets. For example, the data publishers may publish particular data and may enable particular data consumers to access the data for use. The provisioning and management of the centralized permissions management framework may further enable data publishers to share information about the data set with multiple data consumers. Further, the centralized permissions management framework enables data publishers to manage fine grained permissions for data sets owned by or managed by the data publishers. For example, using the centralized permission management framework, a data publisher can define what data particular data consumers can access. Further, a data publisher can define a level of access to the data set for particular data consumers. For example, the data publisher can define table level, column level, row and tag level, etc. permissions for each data consumer such that a particular data consumer is restricted to accessing particular data within the data set. This enables the data publisher to effectively manage the data set and access to the data set. The centralized permissions management framework further enables a data publisher to review access logs and detect anomalies in usage patterns in a central framework. For example, the data publisher can utilize the centralized permissions management framework to manage and review multiple data sets. Further, the centralized permissions management framework enables a data publisher to manage multiple data sets for multiple data consumers. Therefore, the centralized permissions management framework can provide visibility into the use and access of data within the data set. To further manage the data sets, the centralized permissions management framework can manage permission information and publication information for particular data sets. Moreover, the centralized permissions management framework may determine users that can access the data sets based on the publication information and/or the permission information. The centralized permissions management framework can determine users that are authorized to access (e.g., review) a data catalog associated with a particular data set based on the publication information (e.g., the centralized permissions management framework can determine how to publicize the data catalog). Further, the centralized permissions management framework can determine users that are authorized to access the data set based on the permission information (e.g., the centralized permissions management framework can identify, using the permission information, users that are permitted to access the data set).

A data set may be a data store, data repository, data lake, data warehouse, etc. for the storage and management of data. A data lake may be a centralized, curated repository that stores structured and unstructured data at any scale. The data lake may enable a data publisher to store unstructured data and structured data without first structuring the data to a particular format (e.g., a common format). Further, a data publisher can run different analytics on the structured and unstructured data. While data warehouses may store data based on a predefined data structure and schema (e.g., a data publisher may clean, enrich, and transform data prior to storing the data in the data warehouse), data lakes may store data without a defined data structure or schema. For example, the data lake or other type of data set may store particular data as the data is read into the data set. In some embodiments, data may be directly read into the data set from a data source. The data set may act as a virtualized storage drive, enabling authorized parties (e.g., particular data publishers and/or particular data consumers) to perform certain operations corresponding to the data stored within the data set. For example, a particular data publisher, using a data publisher computing device may read from and write to the data set as if the data set were physically coupled to the data publisher computing device. However, particularly in the context of cloud computing, the data set may not be physically coupled to the data publisher computing device. Instead, the data set may be connected to the data publisher computing device via a network. Moreover, rather than being a physical drive, the data set may be a logical volume implemented on one or more underlying physical drives, which drives may vary among data sets or even the same data set. Further, the data set may be implemented according to a certain set of data set characteristics. For example, a data set may have a particular type or a particular size. Therefore, different infrastructure resources with varying capabilities, characteristics, etc. can be provisioned. The data set may include or be associated with particular proprietary data. For example, the data set may store protected data that is personal to a particular data publisher. Further, the data publisher may desire to restrict access to the data stored within the data set. For example, it may be disadvantageous to allow all parties to access the data set and, instead, the data publisher may desire to particularly define data consumers that are authorized to access the data stored within the data set.

Each data set may be associated with a data catalog. The data catalog may act as a catalog of the data stored within the data set. For example, in generating and/or updating the data catalog, the data catalog may catalog data from the data set. Further, the data catalog may store information or metadata about the data stored within the corresponding data set. The data catalog may include metadata summarizing or otherwise representing data from the data set. For example, the data catalog may include an index to the location, schema, and/or runtime metrics of the data of the data set. The data catalog may further store details identifying the data publisher. In some embodiments, the data catalog may store the metadata within metadata tables and each metadata table may correspond to or specify a particular data set. The data catalog may further include metadata that corresponds to extract, transform, and load jobs. The metadata can further refer to data that further describes an entity. For example, metadata of a digital item can be an item category. As another example, metadata for an item can be a cost center. Metadata can be stored separately from the data of the data store. Much like the data stored within the data store, the metadata can be defined by a data publisher, as described herein. Thus, a data publisher can define what data is stored within the data set and what data (e.g., attributes) is stored separately as metadata. Thus, the data stored within the data set and the metadata can be independently created and/or modified. A data publisher can also define a data schema for metadata. The data schema for the metadata can be used to validate the metadata. For example, if a create or update action for the metadata violates the data schema for the metadata, the data publisher that submitted the action may receive an error. Further, a similar data schema can be used to validate data stored within the data set.

A data publisher may manage and modify the data stored by the data set. The data publisher may be the data set owner, a responsible party for managing the data set, the publisher of particular data within the data set, a data manager, or any other party that manages and/or modifies the data set. A data publisher may interact with (to manage and/or modify) the data set via a data publisher computing device. For example, a data publisher may upload new data to the data set, the data publisher may remove data from the data set, the data publisher may modify data within the data set, etc. Further, the data publisher may manage permissions for the data set. For example, the data publisher may manage permissions for the data set identifying parties (e.g., data consumers) that are authorized to access the data set. The data publisher may receive requests to access the data set and may determine whether or not to grant access to the data set. Due to the protected and/or proprietary nature of the data stored within the data set, the data publisher may judiciously determine whether or not to grant access to the data set. For example, the decision of whether or not to grant access to the data set may be based on the particular data consumer, on the type of access requested by the data consumer, the data stored within the data set, or any other characteristics. Therefore, the data publisher can publish data to the data set and, subsequently, manage access to the data set. It will be understood that, in some embodiments, the data publisher may perform only one of publishing the data to the data set and managing the data set. For example, a first data publisher may publish data to the data set and a second data publisher may, subsequently, manage the data set.

A data consumer may consume data from the data set. The data consumer may be a customer or user associated with the data publisher. For example, where the data publisher is Acme Corporation, the data consumer may be a customer of Acme Corporation. The data consumer may request access to the data stored within the data set in order to utilize the data. For example, the data consumer may request access to the data in order to identify particular characteristics of the data set (e.g., the data consumer may request access to the data in order to identify patterns within the data). A data consumer may interact with (to access) the data set via a data consumer computing device. For example, the data consumer may interact with the data set to obtain particular data from the data set and/or to generate statistics associated with the data set. Further, the data consumer may interact with the data publisher in order to request access to the data set. The data consumer may determine that the data set includes data of interest to the data consumer, and, in response to this determination, request access to the data set. For example, the data consumer may be an advertising agency that is interested in determining shopping patterns in order to better direct advertising strategy and, to formulate this advertising strategy, the data consumer may request access to a data set that stores data associated with shopping patterns. In response to receiving access to the data set, the data consumer can read in and parse data from the data set.

In conventional systems, in order to provide access to the data sets, data publishers may implement a decentralized process that is particular to each data set. Traditionally, each data set may be disparate in formation and characteristics, resulting in the decentralized process. For example, each data set may be a separate entity (e.g., a separate data silo) with a corresponding separate data catalog and distinct access controls. As each data set may be decentralized with distinct characteristics, it may be difficult for data publishers to manage and share data associated with multiple data sets in a secure and auditable way. While each data set may be associated with distinct access controls, the data publishers may be required to individually manage the distinct access controls for each data set. This can be disadvantageous where a given data publisher manages and/or is associated with multiple data sets. Further, the distinct and decentralized nature of the data sets may make it difficult for data publishers to manage and share data stored within the data sets in a secure and auditable way. In conventional systems, the distinct and decentralized nature of the data sets can result in a time-consuming and error-prone process to manage the distinct access controls for each data set. Further, a data publisher may associate a first data set managed by the data publisher with first distinct access controls and a second data set managed by the data publisher with second distinct access controls. While each data set may be associated with and managed using distinct access controls, the data publisher may be required to manage and monitor the data sets using multiple distinct access controls. Further, such distinct access controls can cause inconsistency in the implementation of permissions management policies such that a general, centralized permission management policy may not be used in a conventional system. In order to manage the data sets, the data publisher can individually and manually manage each data set based on the corresponding distinct access controls. However, such a manual and individual process can be arduous and may not be capable of being performed in a scalable and efficient manner. Further, such a manual solution may not account for changing access controls and may not allow a data publisher to gather information about a group of data sets, rather a data publisher may be required to manually monitor and manage each data set.

As mentioned above, a data publisher may manage the data sets and may provide access to the data set to particular data consumers. For example, a particular data consumer may request access to a particular data set from a data publisher. It will be understood that a given data publisher may manage and/or be associated with any number of data sets. The data publisher may review the request and determine whether to deny or grant access to the data set for the particular data consumer. Typically, data consumers are responsible for requesting access to a particular data set and the data publisher is responsible for responding to the request. Further, the data consumer may request access to a data catalog associated with the data set in order to determine whether to request access to the data set. For example, the data set may request to review a data catalog prior to requesting access to the data set. Further, the data consumer may be responsible for requesting access to data sets and/or data catalogs from multiple data publishers. This may provide an inefficient or otherwise unsatisfactory experience for data consumers based on the multiple data publishers that may be associated with data sets and/or data catalogs. For example, data consumers may find it difficult and inefficient to search and discover data sets associated with multiple data catalogs and multiple data publishers. Further, the data consumers may be required to interact with and/or request access from multiple, separate teams to gain access to the data sets and/or data catalogs. This may lead to a disjointed and inconsistent experience as the decentralized nature of the data sets may make it difficult for a data consumer to request access to data sets. Further, the disjointed nature of the data discovery process may result in significant delays as a data consumers may first be required to discover a particular data set of interest (which may be difficult as the provided information about the data set may be limited), request access to a data catalog associated with the data set, receive access from the data publisher, parse the data catalog and determine to request access to the data set, request access to the data set, receive access from the data publisher, and parse the data set. Further, the delays may be increased as data consumers may repeat this process for multiple data sets. Such a delay in receiving access to data sets may cause significant delays in obtaining access to data that is required to enable quick insights and decision making. The data consumer may require access to the data stored in a data set in a timely manner and delays in accessing the data may be disadvantageous.

Some aspects of this disclosure address the problems noted above, among others, by establishing a centralized framework that is provisioned for data publishers and data consumers. The centralized framework may be implemented on and/or by a computing device to manage data permissions for data publishers and data consumers. The centralized framework may be a framework shared between multiple data consumers and/or data consumers to increase the efficiency and reduce the delays in requesting and granting access to particular data sets. The centralized framework may provide unified data access control and auditing. For example, the centralized framework may coordinate the access control process and manage the distinct access controls for each data set in order to provide unified data access control for the data publishers and the data consumers. Further, the centralized framework may enable auditing of multiple data sets associated with the data publishers. The centralized framework may gather data about each data set associated with or managed by a particular data publisher. For example, the centralized framework may gather data identifying access granted for each data set of a plurality of a data sets. The centralized framework can further provide this data to the data publisher for use by the data publisher in electing how to manage a particular data set. The centralized framework may further provide catalog registration, publishing and data product discovery. The centralized framework may provide a process for data publishers to register data catalogs and publish the data catalogs. The centralized framework can further manage the data catalogs based on the publication information provided by the data catalogs. For example, the publication information may indicate that the centralized framework is to publish data associated with the data catalogs (e.g., the metadata, a portion of the metadata, and/or additional data associated with the data catalogs) for parsing by data consumers. The centralized framework can further enable, via the published data catalogs, discovery of data sets. Based on enabling the discovery of data sets, the centralized framework may process requests to access the data sets and may manage access to the data sets.

Additional aspects of this disclosure relate to a hybrid data catalog that can be managed and/or associated with the centralized framework. The hybrid data catalog may store data (e.g., information, metadata, etc.) associated with data catalogs that store metadata associated with data sets. For example, the hybrid data catalog may store a portion of the metadata stored by a first data catalog, a portion of the metadata stored by a second data catalog, etc. Further, the hybrid data catalog may store data summarizing the metadata stored by data catalogs. For example, the centralized framework may parse the data catalogs to summarize the metadata stored by the data catalogs and may store the summary in the hybrid data catalog. The hybrid data catalog may store data associated with or hosted across heterogeneously owned data sets. The hybrid catalog may further include one or more of a user interface ("UI"), a command-line interface ("CLI"), or an application programming interface ("API") to manage the data associated with the data catalogs. The centralized framework may further utilize the hybrid data catalog in order to determine information to publicize for data consumers. For example, the centralized framework may make at least a portion of the hybrid data catalog available for review by a portion of the data consumers. Further, the centralized nature of the hybrid data catalog ensures that a data consumer can receive information associated with a plurality of data catalogs and is not required to separately interact with each data catalog. The data consumer can therefore receive information associated with the plurality of data catalogs, without regard to the specific data catalogs. Moreover, the data consumer is shielded from the specifics of the data catalog because the data consumer need only interact with the portion of the data catalog that has been published to the hybrid data catalog and need not have access or request access to the corresponding data catalog.

Further aspects of this disclosure relate to a data set formation service to be used for generating data sets using the centralized framework. A data publisher may interact with the data formation service in order to generate a data set and to publish data to the data set. A data publisher may define the parameters of the data set and may define the data that is to be published to the data set. The data publisher may further identify publication information and permission information for the data catalog. For example, the data publisher may identify, using the publication information, parameters for accessing the data catalog corresponding to the data set (e.g., particular data consumers are authorized to access particular portions of the data catalog as stored in the hybrid data catalog). Further, the data publisher may identify, using the permission information, parameters for accessing the data set (e.g., particular data consumers are authorized to access particular portions or levels of the data set). The centralized framework may receive, from the data set formation service, a definition of the data set and the data catalog and may facilitate access to the data set and the data catalog based on the definition. Therefore, the centralized framework can utilize the data set formation service in order to define publication information and permission information as a part of generating and defining a data set.

Some aspects of this disclosure relate to updating permission and publication information of previously defined data sets. For example, a data publisher may define, at a prior time, a data set and may publish data to the data set. The data publisher can provide information about the data set to the centralized framework for data management. The data publisher may also provide publication information and/or permission information for the particular data set. Further, the data publisher can subsequently update the publication information and/or the permission information for the particular data set. For example, the data publisher can request an update to the authorized access by requesting to remove authorization for a data consumer to access particular portions of the data set, modify what portions of the data set the data consumer is authorized to access, add portions of the data set for access by the data consumer, or otherwise modify the permission information and/or the publication information for the data set. Therefore, the centralized framework can manage permissions for a data set over a full lifecycle of the data set.

Various aspects of the disclosure will now be described with regard to certain examples and embodiments, which are intended to illustrate but not limit the disclosure. Although aspects of the embodiments described in the disclosure will focus, for the purpose of illustration, on a single data set and a single data catalog for the data set, one skilled in the art will appreciate that the techniques disclosed herein may be applied to any number of data sets, data catalogs, hybrid data catalogs, etc. being implemented on the network infrastructure.

FIG. 1 illustrates an example environment 100 in which one or more data publisher computing devices 102 and one or more data consumer computing devices 104 may be implemented according to some embodiments. The example environment 100 may include a data management system 106 that exists within a particular network. The example environment 100 may include more, less, or different components.

The environment 100 can be or include a cloud provider network (sometimes referred to simply as a "cloud"), which refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center ("TC"). TCs are the primary backbone locations linking customers to the cloud provider network, and may be collocated at other network provider facilities (e.g., Internet service providers, telecommunications providers) and securely connected (e.g. via a virtual private network ("VPN") or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services (e.g., infrastructure), such as one or more of the routing devices, and which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The components of the example environment 100 may communicate over a network. The network illustratively represents a distinct network environment. In one embodiment, the network is a virtualized network logically implemented by a physical network referred to as the substrate, which includes physical network hardware such as routers, switches, network address translators ("NATs"), and so on, as well as the physical connections among the devices. For example, the network may represent a virtual private network environment ("VPE"). Generally described, a VPE can represent a virtualized computing network (hosted by a host device or multiple host devices on a physical network) that enables devices connected to (or "inside") the VPE to communicate as if connected to one another via a physical local area network ("LAN"). A VPE may in some instances be referred to as a virtual private cloud ("VPC"). A VPC is a custom-defined, virtual network within a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC), and transit paths. A provider of the substrate network may enable users to configure and manage VPEs on the substrate network. In one specific, non-limiting embodiment, a network computing provider may comprise a plurality of physical network computing devices. The network computing provider may be configured to host a plurality of virtual network computing providers (VPEs/VPCs), each of the plurality of virtual network computing providers logically separated from each other virtual network computing provider of the plurality of virtual network computing providers.

The network environment 100 can logically include one or more data publisher computing devices 102 and/or data consumer computing devices 104, which represent computing devices operating within—or in communication with—the cloud provider network or other network in which infrastructure resources are provisioned for computing services. The data publisher computing devices 102 and/or the data consumer computing devices 104 may be physical devices, or logical devices implemented on underlying physical computing devices. For example, the data publisher computing devices 102 and/or the data consumer computing devices 104 may represent virtualized devices provided by a hosted computing environment, which may also be referred to as a "cloud computing environment." Such an environment can include a number of dynamically provisioned and released computing resources.

The data publisher computing device 102 may be used by or otherwise correspond to a data publisher, a data owner, a data manager, etc. In some embodiments, the data publisher computing devices 102 may refer to a user account that is associated with a data publisher persona. The data publisher computing device 102 may further correspond to a team that owns (manages, publishes, etc.) a particular data set and a corresponding data catalog. It will be understood that a given data publisher may manage and/or be associated with any number of data sets and/or any number of data catalogs. The data publisher computing device 102 may interact with the data management system 106 to publish one or more the data set or the data catalog owned by the team. While a data publisher may be subsequently referred to, it will be understood that reference to a data publisher can include a reference to a data publisher computing device associated with the data publisher.

The data publisher computing device 102 may provide data sets and data catalogs for access by the data consumer computing device 104 (e.g., via the data management system 106). For example, the data publisher computing device 102, via the data management system 106, defines the data sets and the data catalogs, provides publication information and permission information, and provides the data sets and the data catalogs for publication and access by the data consumer computing device 104. The data management system 106 enables the data publisher computing device 102 to publish heterogeneously owned data sets for access by the data consumer computing device 104.

The data consumer computing devices 104 may be used by or otherwise correspond to a data consumer, a data user, a data customer, etc. In some embodiments, the data consumer computing device 104 may refer to a user account that is associated with a data consumer persona. The data consumer computing device 104 may further correspond to a team that digests, parses, ingests, consumes, or otherwise utilizes data from data sets. The data consumer computing device 104 may interact with the data management system 106 to request access to a particular data set. For example, the data consumer computing device 104 may utilize data catalogs to review metadata associated with the data sets and request access from the data management system 106. While a data consumer may be subsequently referred to, it will be understood that reference to a data consumer can include a reference to the data consumer computing device 104 associated with the data consumer.

The data management system 106 can be a computing device or system implementing a centralized permissions management framework for heterogeneously owned data sets. The data management system 106 may offer a unified framework for data publishers to securely and efficiently manage data sets. The data management system 106 may receive information identifying or defining data sets and/or data catalogs from a data publisher. Based on the identified data sets and/or data catalogs, the data management system 106 can provide visibility into particular data sets and may enable the data consumer computing device 104 to browse available data sets and request access to particular data sets. The data publisher can provide publication information to the data management system 106 identifying data consumers that are authorized to browse data sets (using associated data catalogs) and which data sets each data consumer is authorized to browse. The data publisher can further provide permission information to the data management system 106 identifying data sets that a particular data consumer is authorized to access. The data management system 106 can further perform audit checks (e.g., periodically or aperiodically) to compare the permission information provided to the data management system 106 and permission information provided to a data set formation system 108 to generate the data set. The data management system 106 can further fetch updated information from a hybrid data catalog and compare the updated information with the stored information. For example, any changes to the data catalog, as recorded in the hybrid data catalog, may be reported to the data management system 106, and the data management system 106 may be able to verify any changes to the data catalog and/or the data set by performing the audits and logging any changes. The data publishers may define further audits for a particular data set. In some embodiments, if the data management system 106 detects any failures or the data quality score is below a threshold, the data consumers may be notified using a notification service. The data management system 106 can determine if any discrepancies exist between the permission information and report the discrepancies to a data publisher or any other affected party. The data management system 106 can further track metric data using the data set formation system 108 in order to visualize metrics for each data set. Further, the data management system 106 can perform various validations. For example, the data management system 106 can validate (e.g., periodically or aperiodically)

a data consumer's account data (e.g., to verify that a data consumer is associated with a required organization and/or that a data consumer meets the data publisher's predefined conditions). For example, the data publisher may require that a particular data consumer is not located in a particular restricted location. Further, the data management system 106 can verify that the data consumer is located in a first location and/or not located in a second location in order to enable access by the data consumer to the data set. Upon determining that the data consumer is located in a second location (e.g., a restricted location), the data management system can restrict the data consumer's access to the data set.

The data management system 106 may include a data set formation system 108 to receive the request for generation of the data set and/or the request for modification of the data set. The data publisher computing devices 102 may request data set formation system 108 to generate one or more data sets 109A, . . . , 109N (e.g., data identifying data sets 109A, . . . , 109N). In some embodiments, the one or more data sets 109A, . . . , 109N may be associated with or managed by the same data publisher. In other embodiments, the one or more data sets 109A, . . . , 109N may be associated with or managed by different data publishers. It will be understood that the data set formation system 108 may include data identifying any number of data sets. The data set formation system 108 may receive requests to generate data sets and, in response to receiving the requests and validating the request, generate the data sets. The data set formation system 108 may further store one or more pointers indicating where the one or more data sets 109A, . . . , 109N are stored. The data set formation system 108 may identify the one or more data sets 109A, . . . , 109N to enable subsequent modification by the data set formation system 108. For example, the data set formation system 108 may modify one or more data sets 109A, . . . , 109N in response to a request received from a data publisher associated with the particular data set. The data set formation system 108 may further include data set permissions 110. The data set permissions 110 may store permissions information (e.g., permissions information received from a particular data publisher) for each of the one or more data sets 109A, . . . , 109N. The data set formation system 108 may further include one or more data catalogs 111A, . . . , 111N. Each of the one or more data catalogs 111A, . . . , 111N may correspond to particular data set of the one or more data sets 109A, . . . , 109N and may store metadata associated with the particular data set.

The data management system 106 may further include a hybrid data catalog 112. The hybrid data catalog 112 may store metadata associated with the one or more data catalogs 111A, . . . , 111N. For example, the hybrid data catalog 112 may store at least a portion of the metadata stored in each of the one or more data catalogs 111A, . . . , 111N. In some embodiments, the hybrid data catalog may store a summary of the metadata associated with each of the one or more data catalogs 111A, . . . , 111N.

The data management system 106 may further include a permissions management system 114. The permissions management system 114 may store publication information 116 and data set permissions 118 identifying publication information and permission information, respectively, received from data publisher computing device 102. The permission management system 114 may receive requests to access a data set and/or a data catalog and determine a response based on the stored publication information 116 and data set permissions 118.

At [1], the data publisher computing device 102 requests generation of a data set. The data publisher computing device 102 can request that the data management system 106 generate the data set. Further, the data publisher computing device 102 may identify data that is to be stored within the data set. For example, the data publisher computing device 102 can specify one or more data sources to read data into the data set. The one or more data sources can include streaming data sources and/or batch data sources. The data publisher computing device 102 may further identify a data catalog for the data set. For example, the data publisher computing device 102 may identify metadata associated with the data set that is to be stored in the data catalog. In some embodiments, the data publisher computing device 102 may not define a data catalog for the data set and the data management system 106 may define a default data catalog for the data set. For example, default metadata may be gathered and stored by the data management system 106 for the data set. The data publisher computing device 102 may further provide publication information and/or permission information for the data set. The publication information may define data consumers that are authorized to review the data set (e.g., authorized to review the data catalog associated with the data set) and/or request access to the data set and the permission information may define data consumers that are authorized to access the data set. Therefore, the data publisher computing device 102 can request generation of the data set.

At [1'], the data publisher computing device 102 requests modification of a data set. For example, the data publisher computing device 102 may request modification of a previously generated data set. The data publisher computing device 102 may request modification of one or more of the data set, the data catalog, the permission information, the data schema of the data set, or the publication information for the particular data set. For example, the data publisher computing device 102 can request to modify the data that is stored in the data set, the data schema associated with the data set, or the metadata that is stored in the data catalog. Further, the data publisher computing device 102 can request to update the publication information to update the data consumers that are authorized to review the data set and/or to update the permission information to update the data consumers that are authorized to access the data set. Therefore, the data publisher computing device 102 can request modification of the data set.

The data set formation system 108 may receive the request for generation of the data set and/or the request for modification of the data set from the data publisher computing device 102. In response to receiving the request from the data publisher computing device 102, the data set formation system 108 can update and/or generate a data set of the one or more data sets 109A, . . . , 109N corresponding to the request. For example, if the data publisher computing device 102 requests generation of the data set, the data set formation system 108 may generate the data set and add it to the one or more data sets 109A, . . . , 109N. Further, if the data publisher computing device 102 requests modification of the data set, the data set formation system 108 may identify the data set from the one or more data sets 109A, . . . , 109N and modify the data set. The data set formation system 108 may also modify the data set permissions 110 and/or a data catalog of the one or more data catalogs 111A, . . . , 111N corresponding to the data set. The data set formation system 108 may further receive permission information and/or publication information from the data publisher computing device 102 and provide the permission information and/or the publication information to the permissions management system 114.

At [2], the data set formation system 108 requests addition to the hybrid data catalog 112. The request from the data publisher computing device 102 may include information identifying what data from the data catalog is to be included within the hybrid data catalog 112. Therefore, the data set formation system 108 may identify data associated with the data catalog associated with the data set to upload to the hybrid data catalog 112. In some embodiments, the data publisher computing device 102 may not identify a particular portion of the data catalog to be uploaded to the hybrid data catalog 112 and the data set formation system 108 may upload a default portion of the data catalog to the hybrid data catalog 112. Based on identifying a portion of the data catalog to be uploaded to the hybrid data catalog 112, the data set formation system can request addition of the portion of the data catalog (e.g., a portion of the metadata of the data catalog, a summary of the metadata of the data catalog, etc.) to the hybrid data catalog 112. The data set formation system 108 may also provide the publication information received from the data publisher computing device 102 to the hybrid data catalog 112 in order to identify particular data consumers that are authorized to access the metadata associated with the data catalog in the hybrid data catalog. Therefore, the data set formation system 108 can request addition of a portion of the data catalog to the hybrid data catalog 112.

At [3], the data management system 106 adds the data catalog to the hybrid data catalog 112. The data management system 106 may add the metadata and/or data identified by the data set formation system 108 and associated with the data catalog. The data management system 106 may further add the data catalog in conjunction with associated publication information to indicate data consumers that are authorized to review the data catalog. Further, the data management system 106 can interact with a UI, API, CLI, etc. in order to provide the hybrid data catalog 112 (specifically, the data associated with the data catalog that is stored by the hybrid data catalog 112) to a particular data consumer computing device 104 based on the publication information. Therefore, the data management system 106 can add the data catalog to the hybrid data catalog 112.

At [4], the data consumer computing device 104 requests to access the data set. The data consumer computing device 104 may request to access the data set based on an interaction with the hybrid data catalog 112 that is provided via a UI, API, CLI, etc. by the data management system 106. For example, the data consumer computing device 104 may select a button on an interface to request access to the data set. The data management system 106 may receive the request to access the data set and route the request to the permissions management system 114 to determine a response to the request. Therefore, the data consumer computing device 104 can request to access the data set.

At [5], the permissions management system 114 responds to the request to access the data set. The permissions management system 114 may parse the request to access the data set to determine a data consumer computing device 104 associated with the request and the data set associated with the request. Based on determining the data consumer computing device 104 and the data set, the permissions management system 114 can parse the data set permissions 118 to determine if the data consumer computing device 104 is authorized to access the data set. Further, at [6], the data set formation system 108 (or a separate system of the data management system 106) can periodically or aperiodically obtain a group definition and provide the group definition to the permissions management system 114. For example, the data set formation system 108 can obtain, from a data publisher 102 and/or a data consumer 104, a group definition defining a group of data consumers authorized to access a particular data catalog and/or a data set. The response to the request may be based on an obtained group definition (e.g., based on determining that the requesting data consumer is part of the group of data consumers). In some embodiments, the permissions management system 114 may not obtain the obtained group definition. For example, the permissions management system 114 may respond to the request based on the data set permissions 118. In some embodiments, the permissions management system 114 may determine the data consumer computing device 104 is authorized to access the data set and may provide access to the data set. In other embodiments, the permissions management system 114 may determine that the data consumer computing device 104 is not authorized to access the data set and may deny access to the data set. The permissions management system 114 may also generate a prompt for the data publisher computing device 102 associated with the data set. The prompt may prompt the data publisher computing device 102 to indicate whether the data consumer computing device 104 should be granted access to the data set. Based on the response from the data publisher computing device 102, the permissions management system 114 may deny or grant access to the data set for the data consumer computing device 104. A detailed example of an interface for requesting access to particular data sets and is shown in FIG. 2 and described in greater detail below.

Figure 2:
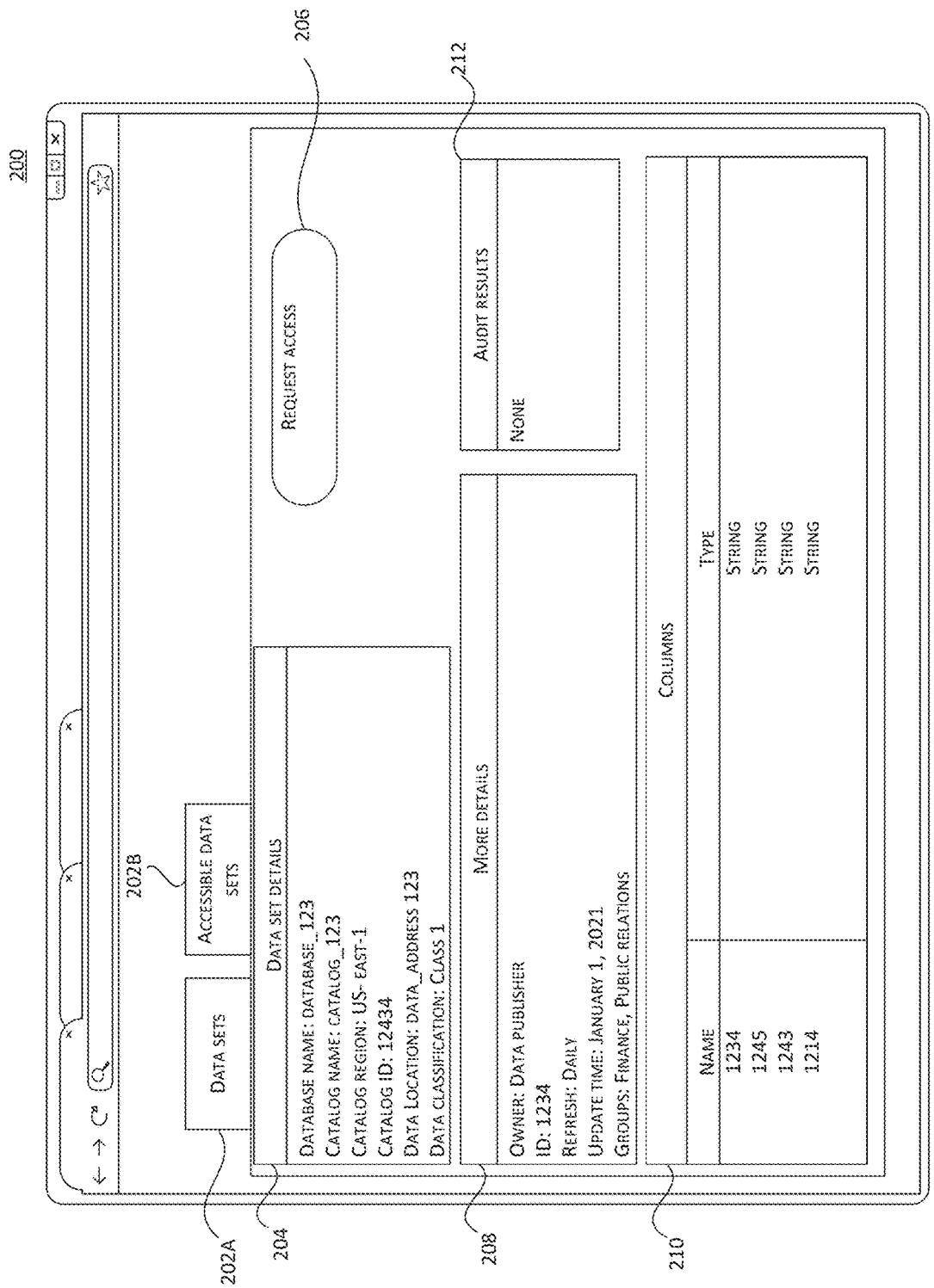
FIG. 2 depicts a diagram of a user interface for requesting access to a particular data set in accordance with aspects of the present disclosure.

FIG. 2 depicts an example interface 200 for managing one or more data sets and requesting to access the one or more data sets. The example interface 200 is illustrative of an interface that the data management system, for example, as illustrated in FIG. 1, can generate or cause to be generated and presented to a user (e.g., a data consumer, etc.) via a computing device (e.g., a data consumer computing device) when interacting with the data management system. The data management system or another computing system may cause the example interface 200 to be presented to the data consumer. In the example of FIG. 2, the interface 200 includes various areas that enable various functionality of the interface 200. For example, the interface 200 includes a page identifier 202A to identify data sets that the data consumer can request access to and a page identifier 202B to identify data sets that the data consumer has access to. The interface 200 may further display the data sets that the data consumer has access to in order to enable discovery of available data sets across an organization and to enable a data consumer to interact with multiple data sets corresponding to multiple data publishers across a shared framework. The interface 200 can facilitate data consumers to discover, understand, and consume data sources. For example, the interface 200 can provide commonly used data sets for discovery by the data consumers (e.g., by identifying details associated with the commonly used data sets). In order to enable discovery by the data consumers, the data management system can pool and read from a hybrid data catalog to index the metadata. Data consumers may be able to search for data sets of interest by interacting with the interface 200. For example, the data management system can make particular data sets searchable via the interface 200. The interface 200 may further display a sample of records for a particular data set in order to enable data set discovery. For example, the interface 200 may display all or a portion of a particular data set for discovery by a data consumer prior to the data consumer requesting access. The interface 200 may further include recommendations for a particular data consumer. For example, the recommendation may be based on data consumer preference and/or based on the data sets that the data consumer has access to. The data management system may utilize machine learning in order to generate the recommendation. For example, the data management system may utilize collaborative filtering, clustering, deep learning approaches, etc.

The interface 200 can further include an area 204 to identify details associated with a particular data set, area 208 to identify additional details associated with the particular data set, and an area 210 to identify details about the columns within the particular data set. It will be understood that the area 210 can further identify details about the rows, tables, or other levels within the particular data set. The interface 200 can further include an area 206 that enables a data consumer to request access to a particular data set. As will be described in more detail below, the data management system may present the information associated with or describing the data set based on determining the data consumer is authorized to review the data set (e.g., the data consumer is authorized to access metadata from the data catalog associated with the data set). Further, the data management system may provide the information associated with or describing the data set so that the data consumer can review metadata associated with the data set and request access to the data set. It will be understood that FIG. 2 is illustrative only, and a data management system may offer any type of information about the data set or metadata associated with the data set. In some embodiments, the data management system may also implement a separate interface that enables data publishers to provide publication information and permission information defining access authorization for data consumers.

The interface 200 may include a page identifier 202A and a page identifier 202B. The page identifier 202A may be associated with data sets that the data consumer is authorized to review metadata associated with the data sets and the page identifier 202B may be associated with data sets that the data consumer is authorized to access. By interacting with the page identifier 202A, the interface 200 may display a list of data sets that the data consumer is authorized to review associated metadata based on the publication information. Further, the data consumer may interact with the list of data sets to select a particular data set for review and/or to request access. In response to this interaction, the interface 200 may display the metadata associated with the data set and enable the data consumer to request access to the particular data set. Further, by interacting with the page identifier 202B, the interface 200 may display a list of data sets that the data consumer is authorized to access. Further, the data consumer may interact with the list of data sets to select a particular data set for access. For example, a data consumer may be able to access "Data Set #1," "Data Set #2," and "Data Set #3" (e.g., the accessible data sets) and may be able to request access to "Data Set #4" (e.g., the data sets). In some embodiments, the page identifier 202A and the page identifier 202B may not separately display the list of data sets and the list of accessible data sets (e.g., in separate interfaces). Instead, the list of data sets and the list of accessible data sets may be displayed within the interface 200 (simultaneously or iteratively).

The interface 200 may further include area 204. The area 204 may identify details associated with a particular data set. For example, the area 204 may identify user specified data to be shared with a data consumer. In some embodiments, the area 204 may include default or modifiable details for data sets. Further, the area 204 may include a plurality of field-value pairs identifying details associated with the data set. A data consumer may interact with the area 204 in order to gather or learn data about the data set. In some embodiments, the area 204 can include information used to verify a particular data set. For example, the data consumer may utilize the details stored by the data set in order to verify that the data set is the correct data set. In the example of FIG. 2, the area 204 includes a plurality of field-value pairs to identify data set details including a first field "database name" and a first field-value "database_123," a second field "catalog name" and a second field-value "catalog_123," a third field "catalog region" and a third field-value "us-east-1," a fourth field "catalog ID" and a fourth field value "12434," a fifth field "data location" and a fifth field value "data_address123," and a sixth field "data classification" and a sixth field value "class 1." It will be understood that the area 204 can include more, less, or different details associated with the data set.

The interface 200 may further include area 208. The area 208 may identify additional details associated with the particular data set. For example, the area 208 may identify further user specified data to be shared with a data consumer. In some embodiments, the area 208 may include default or modifiable details for data sets. Further, the area 208 may include a plurality of field-value pairs identifying details associated with the data set. In some embodiments, the area 208 may include different field-value pairs than those displayed in the area 204. In other embodiments, the area 208 may include field-value pairs expounding on the field-value pairs displayed in the area 204. For example, the field-value pairs of the area 208 and the field-value pairs of the area 204 may correspond to the same fields and the field-value pairs of the area 208 may include additional and/or different field values. The data consumer may further use the field-value pairs of the area 208 to verify that the data set is the correct data set. In the example of FIG. 2, the area 208 includes a plurality of field-value pairs to identify data set details including a first field "owner" and a first field-value "data publisher," a second field "ID" and a second field-value "1234," a third field "Refresh" and a third field-value "daily," a fourth field "update time" and a fourth field value "Jan. 1, 2021," and a fifth field "groups" and a fifth field value "Financing, Public relations." The field "Groups" may identify groups of data consumers that have been authorized (e.g., pre-authorized) to access a particular group of data sets (e.g., a particular group of data sets including the identified data set). It will be understood that the area 208 can include more, less, or different details associated with the data set.

The interface 200 may further include area 210. The area 210 may identify metadata from the data catalog associated with the data set. For example, the area 210 may display and/or summarize a portion of the metadata from the data catalog. The area 210 may enable a data consumer to glean particular information from the metadata of the data catalog. The data consumer may be able to interact with the area 210 in order to modify the metadata shown in area 210. The area 210 may further include metadata identifying particular levels of the data set. For example, the metadata may identify columns, rows, tables, or other delineations (levels, etc.) from the data set. In the example of FIG. 2, the area 210 includes metadata identifying details associated with the columns of the data set. Further, the area 210 identifies details about the columns including a "name" and a "type." It will be understood that the area may identify further details about the columns (or other delineations of the data set). The area 210 further identify a first column with a first name "1234" and a first type "string," a second column with a second name "1245" and a second type "string," a third column with a third name "1243" and a third type "string," and a fourth column with a fourth name "1214" and a fourth type "string." It will be understood that the area 210 may identify more, less, or different columns of the data set.

The interface 200 may further include area 206. The area 206 may allow a data consumer to request access to a particular data set. For example, the interface 200 may identify details (including metadata) associated with the data set and the area 206 may enable a data consumer to request access to the data set. Based on the data consumer interacting with the area 206, the interface 200 may cause a prompt to be sent to the data publisher. The prompt may request for the data publisher to deny the request for access to the data set or accept the request for access to the data set. In some embodiments, upon receiving a response from the data publisher, the area 206 (or another area of the interface 200) may identify the response. The interface 200 can further include an area 212 to display the results of an audit corresponding to a particular data set. In some embodiments, the interface 200 may display area 212 based on a data consumer requesting access to the corresponding data set.

Figure 3:
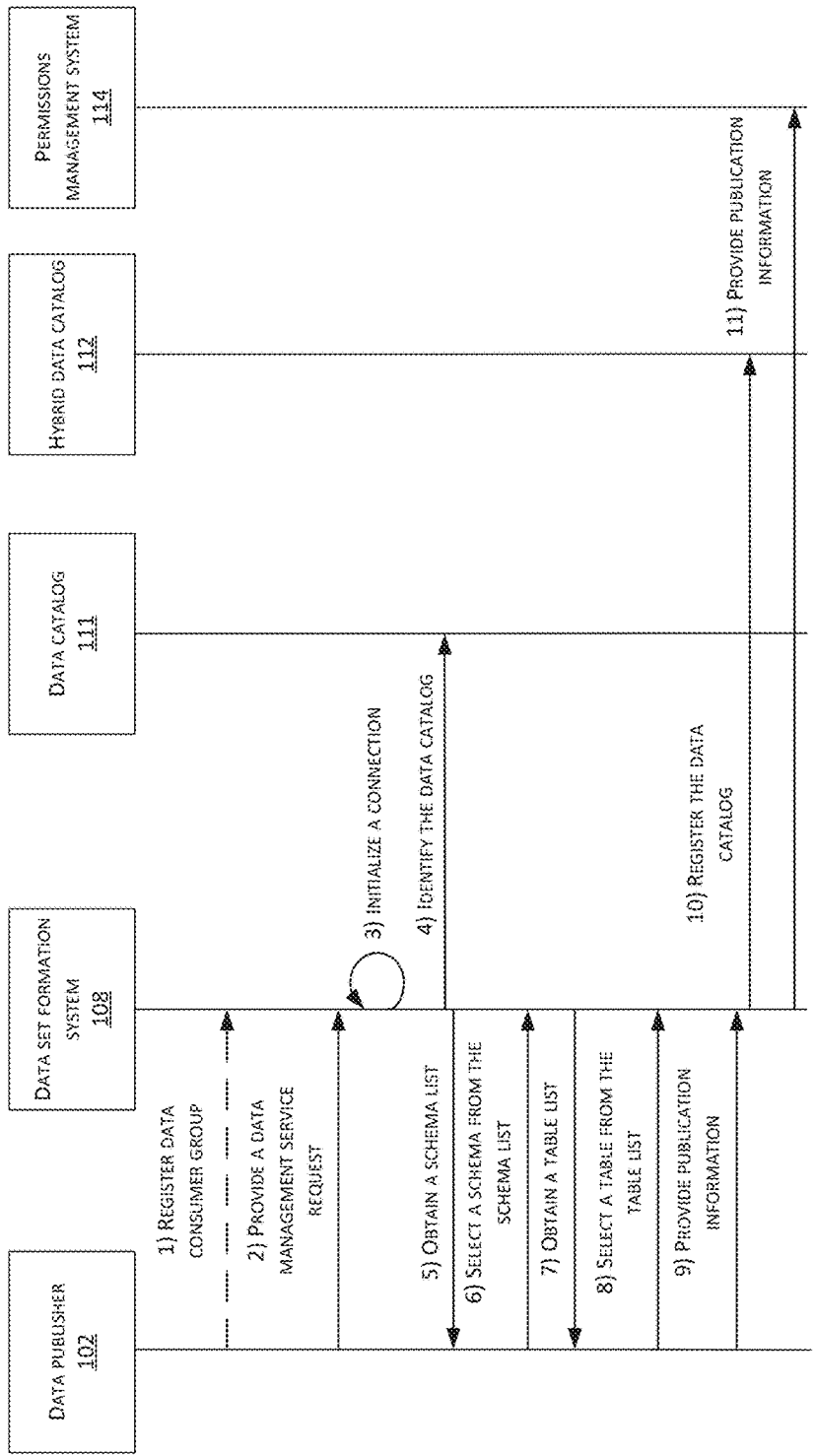
FIG. 3 depicts a schematic diagram showing publication of data catalogs in an example networked environment according to some embodiments.

FIG. 3 depicts interactions among various components shown in FIG. 1 for generating and/or modifying a data set and/or information associated with the data set within which data is published by a data publisher in accordance with aspects of the present disclosure. The networked environment 300 may include various components implemented in a networked configuration as identified in FIG. 1. The networked environment 300 may include one or more data publisher computing devices 102, a data set formation system 108, a data catalog 111, a hybrid data catalog 112, and a permissions management system 114. It will be understood that the networked environment 300 may include more, less, or different components.

As shown in FIG. 3 at (1), the data publisher computing device 102 can provide data consumer group information to the data set formation system 108 or some other device or system (e.g., an authorization system). The data consumer group information may define data consumers (e.g., data consumer accounts, data consumer computing devices) authorized to access a data catalog or a data set. The data set formation system 108 (or some other device or system, such as an authorization system) may provide the data consumer group information to the permissions management system 114. In order to provide the data consumer group information, the data publisher computing device 102 may request generation of the data consumer group, and add data consumers to the data consumer group. In some embodiments, the data publisher computing device 102 may provide data publisher group information defining data publishers (e.g., data publisher accounts, data publisher computing devices) authorized to manage a data catalog or a data set. In some embodiments, the data publisher computing device 102 may not define a data consumer group. At (2), the data publisher computing device 102 provides a data management service request to the data set formation system 108. The data management service request may include a request to generate a data set. In some embodiments, the data management service request may include a request to modify a previously generated data set. For example, the data management service request may include a request to modify the data and/or the metadata associated with a particular data set. The data management service request may further identify publication information and/or permission information for the data set. The publication information may identify a group of data consumers that are authorized to review the metadata and/or to review data associated with the data set in order to request access to the data set. Further, the publication information may identify that a particular group of data consumers are authorized to access metadata for a plurality of data catalogs (e.g., all or a subset of the data catalogs). For example, a finance group can access a plurality of data catalogs associated with finance. The publication information may further identify a level of access (e.g., what metadata is provided to the data consumers for review) for the data consumers. The permissions information may identify a group of data consumers that are authorized to access the data set. Further, the permissions information may identify that a particular group of data consumers are authorized to access a plurality of data sets (e.g., all or a subset of the data sets). For example, a finance group can access data stored in a plurality of data sets (e.g., data lakes) and each user assigned to the finance group can automatically get the same access across the plurality of data sets without a corresponding data publisher for each data set setting permissions for each user of the finance group to access a particular data set. Therefore, the data publisher computing device 102 provides a data management service request to the data set formation system 108.

At (3), the data set formation system 108 initializes a connection based on the received data management service request. The data set formation system 108 may identify the data set corresponding to the data management service request. The data set formation system 108 may initialize a connection to a particular data set (e.g., the data set formation system 108 may initialize a connection to a data set by generating the data set or may initialize a connection to a prior generated data set). The data set formation system 108 may initialize the connection by generating a connection with a node that is storing the data set. In some embodiments, the data set formation system 108 may determine that the connection to the particular data set has already been generated. In response to this determination, the data set formation system 108 may not generate a new connection and may utilize the prior generated connection. The data set formation system may establish the connection and subsequently test the connection to verify that the connection was successfully initialized. The data set formation system 108 can initialize the connection in response to receiving the data management service request.

At (4), the data set formation system 108 identifies the data catalog 111. The data set formation system 108 may identify the data catalog by parsing the data management service request to identify the data set and details associated with the data catalog. In response to identifying the data catalog 111, the data set formation system 108 may update the metadata stored by the data catalog 111. In some embodiments, the data set formation system 108 may determine that the data catalog 111 for the data set has not been generated and may generate the data catalog 111 and store metadata for the data set within the data catalog. The data set formation system 108 may further receive an indication of the metadata from the data catalog 111. For example, the data set formation system 108 may identify the data catalog 111 and obtain the metadata for the data set from the data catalog 111.

At (5), the data publisher computing device 102 obtains a schema list from the data set formation system 108. The data set formation system 108 may parse the metadata in order to identify the schema list. The data set formation system 108 may further provide the schema list from the metadata to the data publisher computing device 102. The schema list may further identify a plurality of schemas associated with the data set.

At (6), the data publisher computing device 102 selects a schema from the schema list. Further, the data publisher computing device 102 can provide an indication of the selected schema to the data set formation system 108. In some embodiments, the data publisher computing device 102 may select multiple schemas from the schema list. The data publisher computing device 102 may select the schema in order to publicize the schema for review by data consumers.

At (7), the data publisher computing device 102 obtains a table list from the data set formation system 108. The data set formation system 108 may parse the metadata in order to identify the table list. Further, the data set formation system 108 may further identify the table list in response to receiving the selection of the schema. For example, the data set formation system 108 may identify a table list identifying one or more tables that are associated with the selected schema from the metadata associated with the data set. The table list may further identify one or more tables of the data set. The data set formation system 108 may further provide the table list from the metadata to the data publisher computing device 102.

At (8), the data publisher computing device 102 selects a table from the table list. Further, the data publisher computing device 102 can provide an indication of the selected table to the data set formation system 108. In some embodiments, the data publisher computing device 102 may select multiple tables from the table list. The data publisher computing device 102 may select the table (e.g., one or more tables) in order to publicize (for a particular group of data consumers) the tables for review by data consumers.

At (9), the data publisher computing device 102 provides the publication information to the data set formation system 108. The data publisher computing device 102, via the publication information, may identify data consumers that are authorized to review a portion of the metadata (e.g., the tables selected by the data publisher computing device 102). The data publisher computing device 102 may also provide permission information identifying a preliminary set of data consumers that are authorized to access the data set associated with the data catalog 111. For example, a particular data consumer and/or a particular group of data consumers may be authorized to review metadata associated with particular data catalogs (e.g., all or a portion of the data catalogs associated with a particular system) and/or access data sets (e.g., all or a portion of the data sets associated with a particular system). It will be understood that the data publisher computing device 102 may delineate the metadata for review by the data consumers. For example, the data publisher computing device 102 may identify particular rows, columns, or other delineations for review by the data consumers. The publication information may include a list of data consumers that are authorized to review the portion of the metadata.

At (10), the data set formation system 108 registers the data catalog 111. The data set formation system 108 may register the data catalog 111 with the hybrid data catalog 112. The data set formation system 108 may register the portion of the metadata from the data catalog with the hybrid data catalog. For example, the data set formation system 108 may store data identifying tables selected from the table list by the data publisher computing device 102 in the hybrid data catalog 112. The hybrid data catalog 112 may further store a portion of metadata associated with multiple data catalogs.

At (11), the data set formation system 108 provides publication information to the permissions management system 114. The publication information may identify particular data consumers that are authorized to review the portion of the metadata associated with the data catalog 111 and stored in the hybrid data catalog. The permissions management system 114 may identify metadata that a particular data consumer is authorized to review and/or data sets that the data consumer is authorized to access. Further, the portion of the metadata stored in the hybrid data catalog 112 and associated with the data set may be provided to a data consumer based on the publication information. For example, a user interface may be generated for the data consumer identifying the portion of the metadata.

Figure 4:
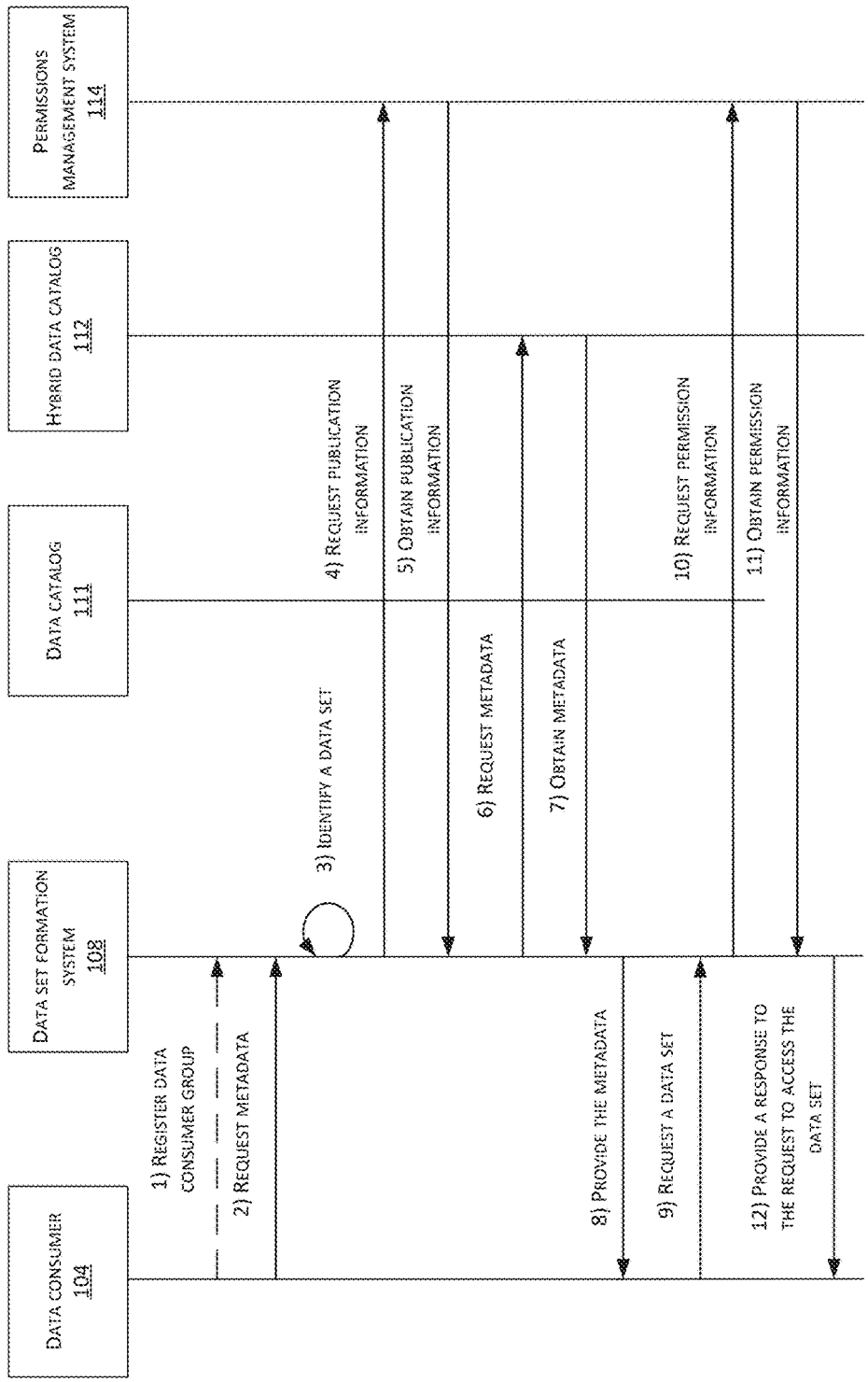
FIG. 4 depicts a schematic diagram showing request of access to a particular data set in an example networked environment according to some embodiments.

FIG. 4 depicts interactions among various components shown in FIG. 1 for requesting access to metadata associated with a data set and access to the data set in accordance with aspects of the present disclosure. The networked environment 400 may include various components implemented in a networked configuration as identified in FIG. 1. The networked environment 400 may include one or more data consumer computing devices 104, a data set formation system 108, a data catalog 111, a hybrid data catalog 112, and a permissions management system 114. It will be understood that the networked environment 400 may include more, less, or different components.

As shown in FIG. 4 at (1), the data consumer computing device 104 can provide data consumer group information to the data set formation system 108 or some other device or system (e.g., an authorization system). The data consumer group information may define data consumers (e.g., data consumer accounts, data consumer computing devices) authorized to access a data catalog or a data set. The data set formation system 108 (or some other device or system, such as an authorization system) may provide the data consumer group information to the permissions management system 114. In order to provide the data consumer group information, the data consumer computing device 104 may request generation of the data consumer group, and add data consumers to the data consumer group. In some embodiments, the data consumer computing device 104 may not define a data consumer group. At (2), the data consumer computing device 104 requests metadata associated with a particular data set from the data set formation system 108. For example, the data consumer computing device 104 can interact with a user interface to request metadata associated with the data set. In some embodiments, the data consumer computing device 104 may not request the metadata and the data set formation system 108 may provide the metadata to the data consumer computing device 104 in response to determining that the metadata has been updated. In other embodiments, the data consumer computing device 104 may not receive metadata and may request access to a data set without requesting and/or receiving the metadata.

At (3), the data set formation system 108 identifies a data set based on the metadata requested by the data consumer computing device 104. The metadata may include a data set identifier and the data set formation system 108 may utilize the data set identifier to identify the data set. In some embodiments, the data consumer computing device 104 may request access to a data set and the data set formation system 108 may identify the data set in response to the request. In other embodiments, the data consumer computing device 104 may not request particular metadata and the data consumer computing device 104 may browse metadata (e.g., available metadata). For example, the data consumer computing device 104 may browse metadata available to a set of data consumers (e.g., all data consumers or all data consumers within a set of data consumers).

At (4), the data set formation system 108 requests publication information associated with the data set from the permissions management system 114. The data set formation system 108 may provide the data set identifier in the request to the permissions management system 114. As the permissions management system 114 can store publication information for a particular data set in association with a corresponding data set identifier, the permissions management system 114 may utilize the data set identifier in order to identify the publication information.

At (5), the data set formation system 108 obtains the publication information from the permissions management system 114. The permissions management system 114 may provide the publication information in response to identifying the publication information based on the request for the publication information. The publication information may identify one or more data consumers that are authorized to review the metadata associated with the particular data set.

At (6), the data set formation system 108 requests metadata from the hybrid data catalog 112. In some embodiments, the metadata may correspond to a sample of the data set. Prior to requesting the metadata from the hybrid data catalog 112, the data set formation system 108 may parse the publication information and determine that the data consumer computing device 104 (e.g., the data consumer, an account associated with the data consumer, etc.) is authorized to review the metadata. The data set formation system 108 may provide the data set identifier in the request to the hybrid data catalog 112. As the hybrid data catalog 112 can store the metadata for a particular a data set in association with a corresponding data set identifier, the hybrid data catalog 112 may utilize the data set identifier in order to identify the metadata.

At (7), the data set formation system 108 obtains the metadata from the hybrid data catalog 112. The hybrid data catalog 112 may provide the metadata in response to identifying the metadata based on the request for the metadata. The metadata may identify metadata for the associated data set.

At (8), the data set formation system 108 provides the metadata to the data consumer computing device 104. In some embodiments, the data set formation system 108 may further validate that the data consumer computing device 104 is authorized to receive (e.g., for review) the metadata from the data set formation system 108. The data set formation system 108 may further confirm that the data consumer computing device 104 is authorized to receive a particular portion of the metadata. Based on this validation (e.g., verification, confirmation, etc.), the data set formation system can provide (or provide access to) the metadata associated with the data set.

At (9), the data consumer computing device 104 requests the data set from the data set formation system 108. In response to receiving the metadata, the data consumer computing device 104 may provide at least a portion of the metadata for review by the data consumer. Further, the data consumer computing device 104 can cause display of an interface that displays at least a portion of the metadata for review by the data consumer. As discussed above, the interface may identify the metadata and may enable a data consumer to request access to a data set. In response to receiving a request for access to the data set from the data consumer, the data consumer computing device 104 can request the data set from the data set formation system 108.

At (10), the data set formation system 108 requests permission information associated with the data set from the permissions management system 114. The data set formation system 108 may provide the data set identifier in the request to the permissions management system 114. The permissions management system 114 may further store the permission information in association with the data set identifier. Further, the permissions management system 114 may utilize the data set identifier in order to identify the permission information.

At (11), the data set formation system 108 obtains the permission information from the permissions management system 114. The permissions management system 114 may provide the permission information in response to identifying the permission information based on the request for the permission information. The permission information may identify one or more data consumers that are authorized to access the data set.

At (12), the data set formation system 108 provides a response to the request to access the data set to the data consumer computing device 104. Prior to providing the response to the data consumer computing device 104, the data set formation system 108 may parse the permission information to determine if the data consumer computing device 104 is authorized to access the data set. The data set formation system 108 can determine that the data consumer computing device 104 is authorized to access the data set and the data set formation system 108, via the response, may provide the data set (or provide access to the data set). Further, the data set formation system 108 can determine that the data consumer computing device 104 is not authorized to access the data set and the data set formation system 108, via the response, may deny the request to access the data set.

Figure 5:
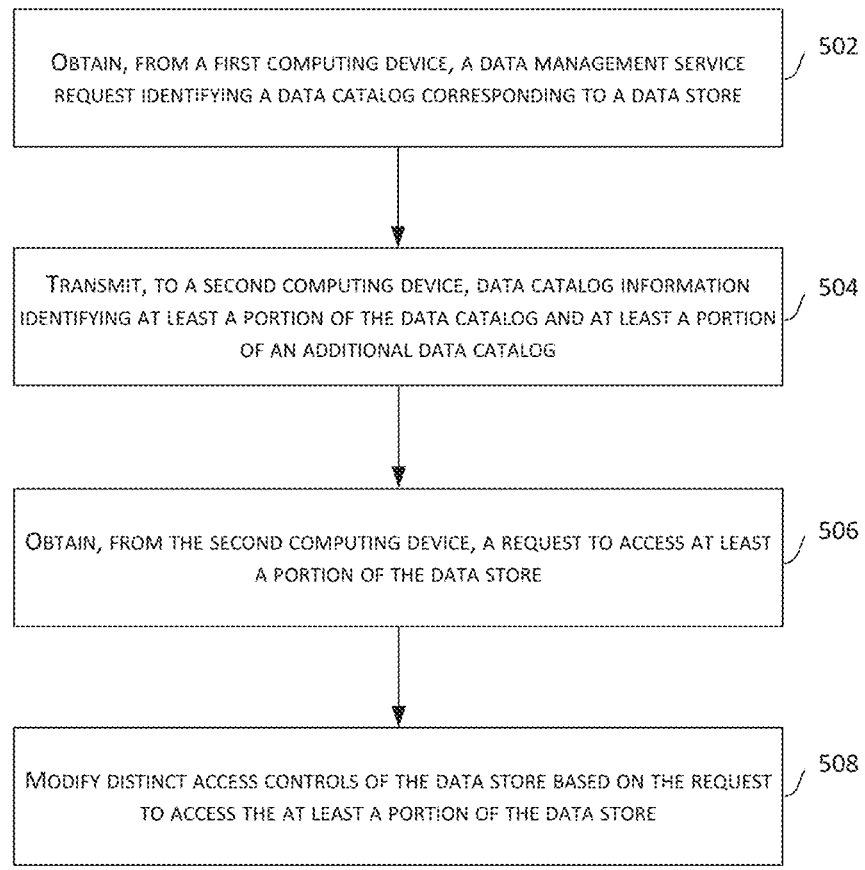
FIG. 5 is a flowchart of an example routine for modifying access controls for a data store based on data catalog information provided to a data consumer.

FIG. 5 describes an illustrative process 500 for managing access to a plurality of data sets. The process 500 includes obtaining a request for access to a data catalog and/or a data set. Further, the process 500 includes transmitting data catalog information in response to the request to access a data catalog and modifying distinct access controls in response to the request to access the data set. By using a data management system to manage multiple heterogeneous data sets, a comprehensive and uniform approach can be provided for managing the data sets.

The process 500 begins at block 502. The process 500 may begin automatically upon initiation of a data source. For example, a data source may begin streaming data and a data publisher may desire to generate a data set to store data streaming from the data source. Further, a data publisher may identify the data source and generate a data management service request based on the data source. The process 500 may be embodied in a set of executable program instructions stored on a computer-readable medium, such as one or more disk drives, of a computing system of a node or a server. When the process 500 is initiated, the executable program instructions can be loaded into memory, such as RAM, and executed by one or more processors of a computing system. Upon initiation of the process, at block 502, a computing system executing the process 500 (e.g., the data management system) may obtain, from a first computing device, a data management service request identifying a data catalog corresponding to a data store. The data store may be and/or may include a data lake. In some embodiments, the first computing device may be data publisher computing device. The first computing device may further correspond to a data publisher account. In some embodiments, in obtaining the data management service request, the computing system may obtain a request for publication of one or more data stores. The request for publication may identify a data source, a data access policy, and/or a security policy. The computing system, in response to the request for publication, may initialize the one or more data stores by collecting data from the data source for storage in the one or more data stores, cataloging the data using the one or more data catalogs, and providing access to the one or more data stores based on the data access policy and/or the security policy. In other embodiments, the computing system may obtain a request for publication of the data catalog for a pre-initialized data store.

The data management service request may identify publication information and one or more data catalogs corresponding to one or more data stores (e.g., data sets) with distinct access controls. The distinct access controls may identify a table, row, column, or other level or delineation of a data store and particular data consumer account that is authorized to access the table, row, column, or other level or delineation of the data store. In some embodiments, the distinct access controls may identify that a first data consumer account is authorized to access a first table of a data store and a second data consumer account is authorized to access a second table of the data store. Further, the distinct access controls may identify that the first data consumer account is authorized to access a first table of a data store and a second data consumer account is not authorized to access the first table of the data store. Each of the one or more data catalogs may be a decentralized data catalog. Further, each of the one or more data catalogs may store metadata corresponding to a particular data store of the one or more data stores. The metadata may comprise an index of a location, a schema, and/or runtime metric of data store by the data store. In some embodiments, the computing system can register the one or more data catalogs in a hybrid data catalog. The hybrid data catalog may include a plurality of metadata from the one or more data catalogs. For example, the hybrid data catalog may consolidate metadata from a plurality of data catalogs for access by the second computing device.

One or more of a first computing device or a second computing device (e.g., a data publisher computing device or a data consumer computing device) can provide information identifying a group of data consumers. The information identifying the group of data consumers may define a group of consumers authorized to access a particular data catalog and/or a data store. Further, the computing system, in responding to requests to access a data catalog or data store, may verify the entity requesting access corresponds to a data consumer of the group of data consumers.

At block 504, the computing system may transmit, to a second computing device, data catalog information identifying at least a portion of the data catalog (e.g., at least a portion of the metadata stored in the data catalog) and at least a portion of an additional data catalog. For example, the additional data catalog may be associated with the data publisher or a different data publisher. It will be understood that the data catalog information may identify at least a portion of any number of data catalogs that may be associated with any number of data publishers. In some embodiments, the second computing device may be a data consumer computing device. The second computing device may further correspond to a data consumer account. In transmitting the data catalog information, the computing system may cause display, via a graphical user interface for one or more data consumers, of the hybrid data catalog based on the publication information. By causing display of the hybrid data catalog, the computing system may enable discovery of the hybrid data catalog by the one or more data consumers. Further, the graphical user interface may display at least a portion of the plurality of metadata.

At block 506, the computing system may obtain, from the second computing device, a request to access at least a portion of the data store. The computing system may obtain the request based on causing display of the hybrid data catalog. In some embodiments, the computing system may further transmit the request for the at least a portion of the data store to the first computing device. In response to transmitting the request to the first computing device, the computing system may obtain a response. The response may include a request approval or a request denial. The response may further identify particular data consumers that have been authorized to access the one or more data stores. The response may further be based on permission information identifying data consumers that are authorized to access particular data stores. The permission information may identify characteristics of data consumers (or computing devices). For example, the permission information may identify that a particular data consumer is authorized to access a particular data store when the data consumer is in a particular location. Therefore, the response may be based on the characteristic of the data consumer. In some embodiments, the computing system may audit the data consumer (e.g., the second computing device) in order to determine if the data consumer is associated with the characteristic. The computing system may determine the data consumer is not associated with the characteristic and may modify the distinct access controls of the data store based on this determination.

At block 508, the computing system may modify distinct access controls of the data store based on the request to access the at least a portion of the data store. Further, the computing system may receive request approval from the first computing device and may modify the distinct access controls to enable the second computing device to access the data store. The computing system may receive request denial from the first computing device and may provide an indication of the denial to the second computing device. The computing system may further determine usage data identifying usage by the second computing device of the data store and provide the usage data to the first computing device. In some embodiments, the computing system can utilize the modified distinct access controls to modify the access controls of the data store (e.g., the access controls stored by the data set formation system). In other embodiments, the computing system can utilize the modified distinct access controls to modify the access controls of the computing system (e.g., the access controls stored by the permission management system). It will be understood that the modified access controls may be utilized to modify any data associated with the data store.

Figure 6:
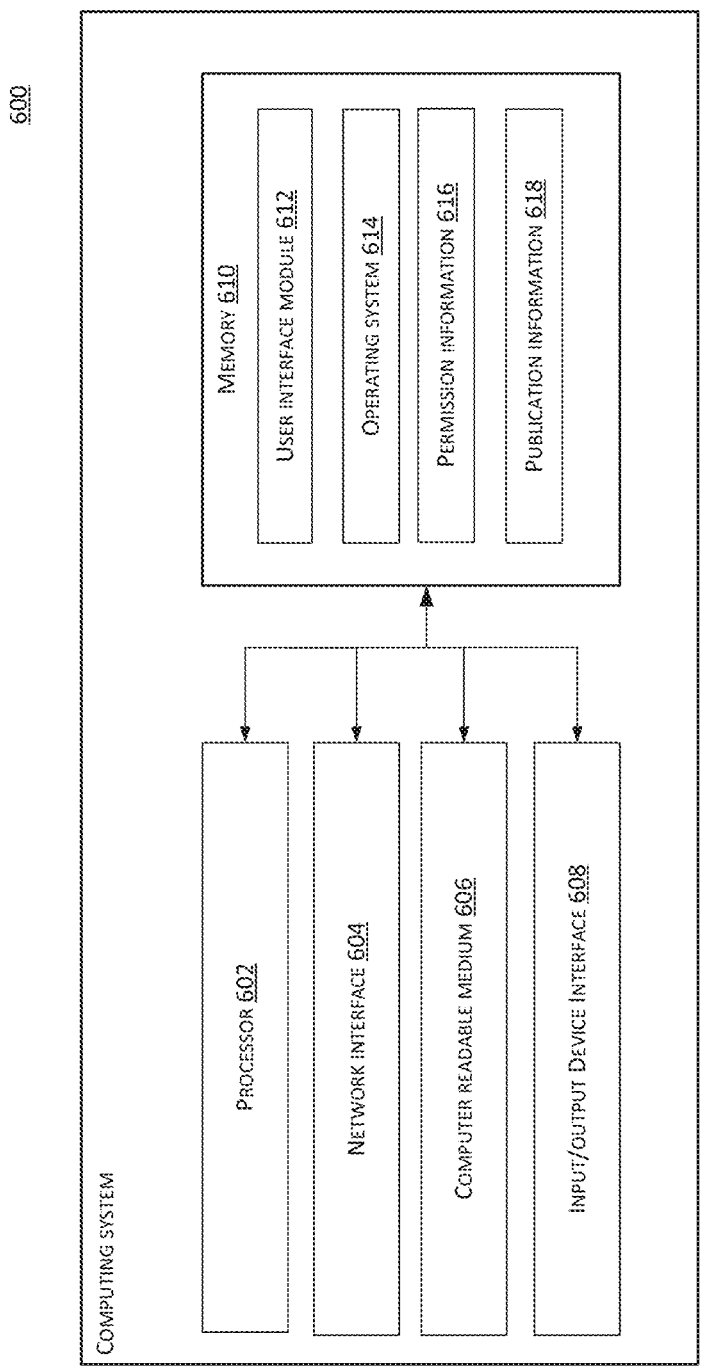
FIG. 6 shows an example computing device that may be used to implement aspects of the present disclosure.

FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an input/output ("IO") interface in communication with one or more microphones; and one or more computer readable memories 610, such as random access memory ("RAM") and/or other volatile non-transitory computer-readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store a user interface module 612. The computer readable memory 610 can store an operating system 614 that provides computer program instructions for use by the computer processor 602 in the general administration and operation of the computing system 600. The computer readable memory 610 can further include computer program instructions and other information for implementing aspects of the present disclosure. For example, in one embodiment, the computer readable memory 610 may include permission information 616. As another example, the computer-readable memory 610 may include publication information 618. In some embodiments, multiple computing systems 600 may communicate with each other via respective network interfaces 604, and can implement multiple sessions each session with a corresponding connection parameter (e.g., each computing system 600 may execute one or more separate instances of the processes 500), in parallel (e.g., each computing system 600 may execute a portion of a single instance of a process 500), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only memory ("ROM"), erasable programmable read-only memory ("EPROM"), electronically erasable programmable read-only memory ("EEPROM"), registers, hard disk, a removable disk, a compact disc read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   under control of a computing system comprising one or more processors configured to execute specific instructions,
      obtaining, from a data publisher account, a data management service request identifying publication information and a first data catalog corresponding to a first data store with distinct access controls, the distinct access controls identifying access granted to a data consumer account, wherein the first data catalog stores metadata corresponding to the first data store of a plurality of data stores, wherein the plurality of data stores are associated with a plurality of data publishers, wherein the first data catalog is associated with a first data publisher of the plurality of data publishers, wherein the first data catalog stores metadata identifying information associated with the first data store;
      registering the first data catalog in a hybrid data catalog, wherein the hybrid data catalog consolidates a plurality of metadata from a plurality of data catalogs associated with the plurality of data stores;
      causing display of at least a portion of the hybrid data catalog via a graphical user interface based at least in part on the publication information, wherein graphical user interface enables discovery of the information associated with the first data store by the data consumer account, wherein the graphical user interface displays at least a portion of the plurality of metadata;
      obtaining, from the data consumer account, a request to access the first data store based on an interaction with the graphical user interface;
      obtaining a request approval, from the data publisher account in response to the request to access the first data store, wherein the request approval identifies the data consumer account has been authorized to access the first data store; and
      modifying the distinct access controls of the first data store based on obtaining, from the data publisher account, the request approval.

2. The computer-implemented method of claim 1, wherein obtaining the data management service request further comprises:
   obtaining, from the data publisher account, a request for publication of the first data store, wherein the request for the publication of the first data store identifies one or more of a data source, a data access policy, or a security policy; and
   initializing the first data store, wherein initializing the first data store comprises:
      collecting data from the data source for storage in the first data store;
      cataloging the data using the first data catalog; and
      providing access to the first data store based at least in part on one or more of the data access policy or the security policy.

3. The computer-implemented method of claim 1, wherein the data consumer account is a first data consumer account of a plurality of data consumer accounts, wherein the distinct access controls identify that the first data consumer account is authorized to access a first table of the first data store and a second data consumer account of the plurality of data consumer accounts is authorized to access a second table of the first data store.

4. The computer-implemented method of claim 1, wherein the distinct access controls identify:
   one or more of a table, a row, or a column of the first data store; and
   a particular data consumer account that is authorized to access the one or more of the table, the row, or the column of the first data store.

5. A system comprising:
   a data management system comprising computer-readable memory and one or more processors configured to:
      obtain, from a first computing device, a data management service request identifying a first data catalog corresponding to a data store with distinct access controls, the distinct access controls identifying access granted to data consumers to access the data store, wherein the first data catalog stores metadata corresponding to the data store of a plurality of data stores, wherein the first data catalog is associated with a first data publisher of a plurality of data publishers, and wherein the first data catalog stores metadata identifying information associated with the data store;
      transmit, to a second computing device, data catalog information comprising at least a portion of the first data catalog and at least a portion of a second data catalog associated with a second data publisher of the plurality of data publishers, wherein the data catalog information is based at least in part on data stored in the data store, wherein the distinct access controls identify data consumers authorized to access the data stored in the data store;
      obtain, from the second computing device, a request to access at least a portion of the data store based on transmitting the data catalog information;
      transmit, to the first computing device, the request to access the at least a portion of the data store;

in response to transmitting the request to access the at least a portion of the data store, obtain, from the first computing device, a response, wherein the response identifies the first computing device has been authorized or declined access to the at least a portion of the data store; and modify the distinct access controls of the data store based on obtaining, from the first computing device, the response.

6. The system of claim 5, wherein the distinct access controls identify:

one or more of a table, a row, or a column of the data store; and the second computing device is authorized to access the one or more of the table, the row, or the column of the data store, wherein prior to modifying the distinct access controls of the data store, the second computing device is not authorized to access the one or more of the table, the row, or the column of the data store.

7. The system of claim 5, wherein the distinct access controls identify the second computing device is authorized to access one or more data stores based on the second computing device corresponding to a particular group of computing devices or a particular role.

8. The system of claim 5, wherein the metadata comprises at least one of: an index of a location, a schema, or runtime metrics of data stored by the data store.

9. The system of claim 5, wherein to obtain the data management service request, the one or more processors are further configured to:

obtain, from the first computing device, a request for publication of the data store wherein the request for the publication of the data store identifies one or more of a data source, a data access policy, or a security policy; and initialize the data store, wherein to initialize the data store, the one or more processors are further configured to:
collect data from the data source for storage in the data store;
catalog the data using the first data catalog; and
provide access to the data store based at least in part on one or more of the data access policy or the security policy.

10. The system of claim 5, wherein to obtain the data management service request, the one or more processors are further configured to:

obtain, from the first computing device, a request for publication of the first data catalog, wherein the data store comprises a pre-initialized data store.

11. The system of claim 5, wherein the one or more processors are further configured to:

obtain, from the first computing device, permission information, the permission information identifying a characteristic of the second computing device;

determine the characteristic is not associated with the second computing device; and further modify the distinct access controls of the data store based on determining the characteristic is not associated with the second computing device.

12. The system of claim 5, wherein the one or more processors are further configured to:

determine usage data identifying usage by the second computing device of the data store; and provide, to the first computing device, the usage data.

13. The system of claim 5, wherein the data store comprises one or more data lakes.

14. The system of claim 5, wherein the one or more processors are further configured to:

obtain, from the first computing device or a second computing device, information identifying a group of data consumers; and determine the second computing device corresponds to the group of data consumers, wherein the response is based on determining the second computing device corresponds to the group of data consumers.

15. The system of claim 5, wherein the one or more processors are further configured to register the first data catalog in a hybrid data catalog, wherein the hybrid data catalog consolidates data from a plurality of data catalogs for access by the second computing device.

16. A system comprising:

a data storage medium; and one or more computer hardware processors in communication with the data storage medium, wherein the one or more computer hardware processors are configured to execute computer-executable instructions to at least:

obtain, from a first computing device, a data management service request identifying a first data catalog corresponding to a data store with distinct access controls, the distinct access controls identifying access granted to data consumers to access the data store, wherein the first data catalog stores metadata corresponding to the data store of a plurality of data stores, wherein the first data catalog is associated with a first data publisher of a plurality of data publishers, wherein the first data catalog stores metadata identifying information associated with the data store;

transmit, to a second computing device, data catalog information comprising at least a portion of the first data catalog and at least a portion of a second data catalog associated with a second data publisher of the plurality of data publishers, wherein the data catalog information is based at least in part on data stored in the data store, wherein the distinct access controls identify data consumers authorized to access the data stored in the data store;

obtain, from the second computing device, a request to access at least a portion of the data store based on transmitting the data catalog information; and modify the distinct access controls of the data store based on the request to access the at least a portion of the data store.

17. The system of claim 16, wherein the distinct access controls identify:

one or more of a table, a row, or a column of the data store; and the second computing device is authorized to access the one or more of the table, the row, or the column of the data store, wherein prior to modifying the distinct access controls of the data store, the second computing device is not authorized to access the one or more of the table, the row, or the column of the data store.

18. The system of claim 16, wherein to obtain the data management service request, the one or more computer hardware processors are configured to execute further computer-executable instructions to at least:

obtain, from the first computing device, a request for publication of the data store wherein the request for the publication of the data store identifies one or more of a data source, a data access policy, or a security policy; and initialize the data store, wherein to initialize the data store, the one or more computer hardware processors are configured to execute further computer-executable instructions to at least:
   collect data from the data source for storage in the data store;
   catalog the data using the first data catalog; and
   provide access to the data store based at least in part on one or more of the data access policy or the security policy.

19. The system of claim 16, wherein to obtain the data management service request, the one or more computer hardware processors are configured to execute further computer-executable instructions to at least:
   obtain, from the first computing device, request for publication of the first data catalog, wherein the data store comprises a pre-initialized data store.

20. The system of claim 16, wherein the second computing device is associated with a data consumer account and the first computing device is associated with a data publisher account.

21. The system of claim 16, wherein the first data publisher is associated with a plurality of data catalogs, the plurality of data catalogs comprising the first data catalog and a third data catalog, the data catalog information further comprising at least a portion of the third data catalog.

\* \* \* \* \*